United States Patent

Levinn

[15] 3,703,693
[45] Nov. 21, 1972

[54] LIQUID LEVEL SENSING SYSTEM
[72] Inventor: Robert N. Levinn, Catskill, N.Y.
[73] Assignee: American Thermostat Corporation, South Cairo, N.Y.
[22] Filed: April 1, 1971
[21] Appl. No.: 130,200

[52] U.S. Cl. ..................337/1, 60/23, 73/378.3, 137/386, 337/140, 340/244 R
[51] Int. Cl.......F03g 7/06, G08b 21/00, H01h 61/01
[58] Field of Search .200/82 C, 153 T; 337/126, 131, 337/133, 140, 382, 393, 395, 1; 60/23; 73/378.3; 340/244 R; 137/386

[56] References Cited

UNITED STATES PATENTS

| | | | |
|---|---|---|---|
| 3,594,675 | 7/1971 | Willson | 337/140 |
| 3,594,674 | 7/1971 | Willson | 337/140 X |
| 3,516,082 | 6/1970 | Cooper | 337/393 X |
| 3,403,238 | 9/1968 | Bughler et al. | 337/393 |
| 3,335,243 | 8/1967 | Canaday | 337/102 |
| 2,340,877 | 2/1944 | Hausler | 337/133 |

OTHER PUBLICATIONS

IBM Technical Disclosure, Vol. 11, No. 12, May 1969 page 1,701 (R. G. Beistle)

*Primary Examiner*—Gene Z. Rubinson
*Assistant Examiner*—Dewitt M. Morgan
*Attorney*—James and Franklin

[57] ABSTRACT

For detecting a level of a liquid in a container, an element is mounted in a container so as to extend along an area corresponding to the location where liquid depth is to be detected. That element is formed of a material having a "memory" which is actuated when the material is subjected to a predetermined temperature, to cause the material to change its shape and therefore alter the effective length of the element. Heat is provided to the element, as by causing an electrical current to pass therethrough, in such an amount as to cause said element to be heated to said predetermined temperature when said element is enveloped by air or some other fluid of relatively low heat-dissipating characteristic, but the liquid of the level of which is to be sensed has a relatively high heat-dissipating characteristic such that the liquid-enveloped sections of the element will not be raised to said predetermined temperature. It is only when a given length of said element is exposed to air or other fluid, thus causing that length to exceed said predetermined temperature, that sufficient force is developed to actuate an appropriate work means such as a switch controlling an alarm system or the like.

3 Claims, 4 Drawing Figures

PATENTED NOV 21 1972 3,703,693

INVENTOR
ROBERT N. LEVINN
BY
ATTORNEYS

LIQUID LEVEL SENSING SYSTEM

The present invention relates to a system for detecting the level of liquid in a container, and also functioning to detect excessive temperatures of that liquid.

There are many instances where it is desired to know when the level of liquid in a given container departs from a predetermined norm. In one conventional case a certain amount of liquid should be maintained in a reservoir at all times, and when the liquid level in that reservoir falls below a desired value an indication of that condition should be given or apparatus should be automatically set into operation to cure the situation. Thus an alarm may be sounded, alerting the operator to the situation and giving him time and opportunity to refill the container, or refilling apparatus may be automatically actuated. When the liquid level in the reservoir is once again at an appropriate level the operator should be apprised of that fact so that he will not overfill the container, or, in the case of automatic operation, the automatic refilling apparatus should be stopped.

There is in particular a great need for liquid level sensing systems in automobiles. Most automobiles have water-containing radiators, and unless those radiators function properly the motor of the automobile cannot be used. Today as a practical matter the only type of indication available to the motorist concerning the condition of his radiator is a temperature gauge. This gauge indicates when the temperature of the water in the radiator exceeds a safe value. When that safe value is exceeded the motorist must stop immediately; if he does not, he risks serious damage to his engine. This emergency stopping may occur anyplace, and often does occur long distances from any source of water, thus causing grave inconvenience. Overheating of the water in automobile engines usually comes about because the water level in the radiator is below proper value, but the temperature-indicating systems now in use do not indicate to the motorist when the water level is low; they only indicate to him when the water level has become so low and the use of the car has been such that the car can no longer be used at all.

It would be exceedingly helpful if the motorist were to be apprised of an insufficient water level in his radiator before a critical emergency condition has arisen. In the past it has been possible to ascertain radiator water level only by opening the hood of the engine, removing the radiator cap, and performing a visual check. Ideally, this operation is performed each time that gasoline is put into the car, but as a practical matter this ideal checking is not usually carried out. Moreover, even if the water level is thus visually checked at frequent intervals, the development of a leak in the radiator will not become apparent until the next routine check, and it may well be that the leak will be sufficiently great so that overheating will occur before the next replenishment of the gas supply.

If the motorist could be apprised of the fact that the water level in his radiator is approaching the dangerously low level before the dangerous level actually exists, he will have opportunity to find a source of water and refill his radiator, thereby avoiding the occurrence of an emergency situation. The system of the present invention will function very well in that regard. Moreover, the system of the present invention will also function to detect overheating of radiator water even if the water level may be within proper operating ranges, and thus a single system in accordance with the present invention will provide the safe-temperature indication of the presently available automobile cooling system indicator systems and at the same time will give warning to the operator of insufficient water level even though the water temperature may still be within normal operating ranges.

It is the prime object of the present invention to devise an effective system for detecting liquid level within a container which is simple, reliable and accurate.

It is another object of the present invention to devise a liquid level sensing system which is also effective to sense liquid temperature and to give an indication or perform an actuation of some external element either when the liquid level departs from desired value or the liquid temperature departs from desired value or both.

It is still another object of the present invention to devise a system for sensing liquid level and/or temperature which can be readily adjusted or adapted to the detection of different liquid levels and/or different liquid temperatures over the given range, and which can likewise be readily adapted for use with different types of liquids.

These objects are attained through a system in which the active element is formed of a material having a very special characteristic — it is not appreciably affected by temperature in a given range up to a given temperature, but above that value it changes its effective length quite radically and with the exercise of appreciable force. One substance having that characteristic is a nickel-titanium intermetallic compound known as Nitinol. It is disclosed in U.S. Pat. No. 3,174,851 of Mar. 23, 1965 entitled "Nickel-Based Alloys," U.S. Pat. No. 3,351,463 of Nov. 7, 1967, entitled "High Strength Nickel-Base Alloys" and U.S. Pat. No. 3,403,238 of Sept. 24, 1968 entitled "Conversion of Heat Energy to Mechanical Energy," all patents being assigned to the United States of America as represented by the Secretary of the Navy. This material has a "memory." If it is given a predetermined "memory" shape or configuration and subjected to an appropriate treatment, and thereafter it is changed to a given shape or configuration, it will retain that given shape or configuration until such time as it is subjected to a predetermined elevated temperature, for example, around 210° F. When it is subjected to that activating temperature it tends quite strongly to return to its original "memory" shape or configuration. This material is available in elongated wire or strip-shaped lengths. These lengths can be given a sinuous "memory" configuration and heat treated, and can thereafter be stretched out to substantially linear configuration (the aforementioned "given" configuration). It will retain that given linear configuration until subjected to the predetermined given activating temperature, at which time it will revert to its sinuous "memory" configuration. Within a range of temperatures, the predetermined temperature at which the wire will tend to revert to its "memory" configuration can be varied by altering the proportions of the constituents of the intermetallic compound, as is known to the art.

The elongated element of the material thus described is inherently effective as a temperature-sensing instrumentality. To make it into a liquid-level sensing instrumentality, in accordance with the present invention, the element is mounted in a container so as to extend along that portion of the container where liquid level is to be sensed. It is then supplied with a controlled amount of heat so that when the element is enveloped or surrounded by air or other ambient atmosphere having a relatively low heat-dissipating characteristic the element will heat to a temperature above the activating temperature, thereby to cause the thus heated sections of the element to tend to change from their linear condition to their "memory" configuration. However, the amount of heat provided to the element is also such that those sections of the element which are enveloped or surrounded by the liquid which is to be detected in a container, which liquid will have a greater heat-dissipating characteristic than the air or ambient atmosphere, will not be heated to that activating temperature. As a result, that portion of the length of the elongated element which is in the liquid will tend to retain its given configuration and only that portion of the element which is exposed to air or other ambient atmosphere will tend to change to its "memory" configuration. Each elemental section of length of the element which is subjected to temperature conditions such as to cause it to tend to resume its "memory" configuration will generate a certain amount of force in thus tending to change its configuration. The element may be maintained in its original condition by some biasing force, the value of which may be adjusted to desired magnitude. By varying the biasing force exerted on the elongated element, more or less of that elongated element will have to be exposed to air before the elongated element will actually resume its "memory" configuration. The thus-exposed length of the elongated element is, of course, a function of the level of the liquid in the container. Thus when the liquid level starts to fall a short length of the elongated element will be exposed to the air or other ambient medium having a poorer heat-dissipating characteristic, and eventually, as the liquid level continues to fall, enough of the elongated element will be thus exposed so as to produce a force sufficient to overcome the biasing force and thereby enable the involved section of the elongated element to resume its "memory" configuration.

The elongated element can be connected in any appropriate manner to a work element, such as a switch in an alarm or operating circuit, and when the elongated element or any appropriate lengths thereof does assume its "memory" configuration the switch or other work element will be actuated, thereby to cause an alarm (visual or audible) to go off or to automatically set suitable apparatus into operation. In the case of a motor vehicle, the actuation of the switch-type work element may cause a lamp to light on the dashboard of the car, thereby to apprise the operator of the vehicle that the water level in his radiator is at a dangerously low level.

The above-described mode of operation assumes that the temperature of the liquid which surrounds at least a portion of the elongated element is at a safe value below the activating temperature of the elongated element. The elongated element may be so constructed as to tend to resume its "memory" configuration at a temperature corresponding to an unsafe level of temperature of the liquid. If then the liquid attains that unsafe temperature level, the elongated element will tend to resume its "memory" configuration even though the level of liquid in the container may be well above the danger level. Thus the work element will be actuated not only when the water level becomes insufficiently low but also when the water temperature becomes excessively high even if the water level is still at a safe value.

To the accomplishment of the above, and to such other objects as may hereinafter appear, the present invention relates to a system for sensing liquid level, and also, if desired, for sensing liquid temperature, and for actuating work means in accordance therewith, as defined in the appended claims and as described in this specification, taken together with the accompanying drawings, in which:

Figure 1:
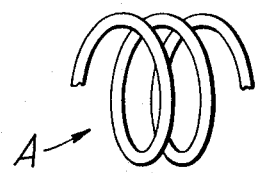
FIG. 1 is a view of a typical section of the elongated element temperature sensing means used in the present invention in its "memory" configuration.
Figure 2:
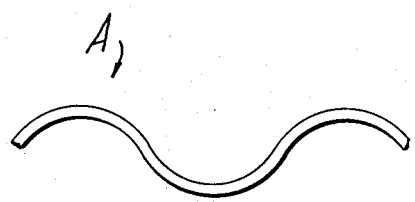
FIG. 2 is a view similar to FIG. 1 but showing a specifically different "memory" configuration for the elongated element.
Figure 3:
FIG. 3 represents the elongated element section of FIG. 1 or 2 stretched out from its "memory" configuration to its given configuration.

As has been indicated, the elongated temperature sensing element is formed of a material which has a "memory" effective when the material in a given configuration is subjected to a predetermined activating temperature to cause the material to resume a shape or configuration which had previously been imparted to it. For purposes of illustration the elongated element, generally designated A, is provided, as embodied in the installation here disclosed, with a "memory" which makes it resume a coiled shape, such as is shown in FIG. 1, or a sinuous or undulating shape such as is shown in FIG. 2. This "memory" is imparted to the material by causing it to assume the configuration shown in FIGS. 1 or 2, by way of example, and then subjecting it to an appropriate heat treatment while it is in that configuration. Thereafter the elongated strip or wire is stretched out into a given configuration such as the substantially straight-line configuration shown in FIG. 3. As a practical matter, there may well be some undulation of low amplitude in the wire when it is in its given configuration, and such undulations are shown in FIG. 3, but they are far less is amplitude than the undulations in the sinuous "memory" configuration of FIG. 2 or the coiled "memory" configuration of FIG. 1. It will be appreciated, therefore, that when the elongated wire has been changed from its configuration of FIGS. 1 or 2 to its configuration of FIG. 3 the effective length of the wire will be greatly increased, and conversely when the material, after being subjected to the predetermined activating temperature, tends to change from its given configuration shown in FIG. 3 to its "memory" configuration the effective length of the elongated element, from one end thereof to the other, will be greatly shortened.

Figure 4:
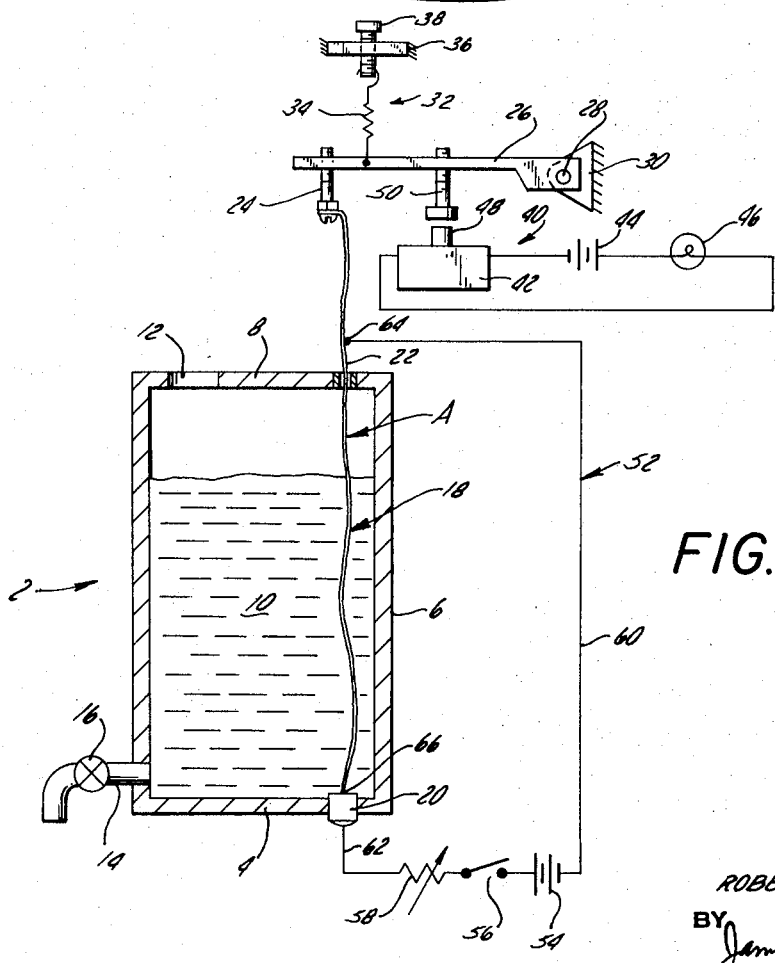
FIG. 4 is a semi-schematic view showing a mounting and actuating arrangement for a system of the present invention specifically disclosed as actuating a work element of the electrical switch type.

There is disclosed in FIG. 4, in semi-schematic and idealized form, a container generally designated 2 and formed of a bottom wall 4, side walls 6 and a top wall 8. This container 2 is adapted to receive a supply of liquid 10, which may be water or any other desired substance. A filling opening 12 is provided at the top of the container 2 and an outlet 14 controlled by valve 16 is provided at the bottom thereof. This showing of a container for liquid is exemplary only; the system of the present invention can be used in many different types, designs and styles of containers, and the specific container construction forms no part of the present invention The elongated element A in the form of a strip or wire generally designated 18 and having the characteristics described above is mounted in the container 2 so as to extend substantially vertically from the bottom wall 4 to the top of wall 8 thereof (although it will be understood that it is not essential that the element 18 extend the full height of the container 2; it is only essential that it extend along that portion of the height of the container 2 where the level of the liquid 10 is to be sensed). The lower end of the element 18 is secured to a sealing member 20 located in the bottom wall 4, while the upper end of the element 18 extends out through the top wall 8 via an opening 22 which can be, but need not be, a sealed opening — it is here disclosed as an unsealed opening. One end of the element 18 may be fixed in position (that is here shown as the lower end thereof) but the other end of the element 18 (here shown as its upper end) is not fixed in position, but is instead attached, by means of the adjusting screw 24, to an arm 26 pivotally mounted at 28 on any appropriate fixed support 30. A biasing means generally designated 32 is active on the arm 26 and through the arm 26 on the elongated element 18, so as to tend to retain that elongated element in its elongated substantially linear condition shown in FIG. 3. It is here shown as comprising a spring 34, one end of which is secured to the arm 26 and the other end of which is secured to an appropriate fixed support 36. The force exerted by the biasing means 32 on the elongated element 18 is preferably adjustable, this being readily accomplished by any suitable construction, such as the adjusting screw 38 interposed between the support 36 and the upper end of the spring 34, the effective length of that screw as it extends from the support 36 controlling the degree to which the spring 34 is stretched and thus adjusting the force which it exerts on the arm 26 and the element 18.

The arm 26 represents an exemplary actuating mechanism constituting a part of a work means generally designated 40, that work means being here disclosed as an electrical switch 42 connected in circuit with the battery or other power source 44 and an alarm light 46. It will be understood, however, that the work means and its effect can take a virtually unlimited variety of forms, electrical or mechanical, alarm or automatic actuation, etc. The switch 42 has an operating button 48 resiliently projected out therefrom and the arm 26 has an adjustably mounted screw 50 mounted thereon in opposing registration with the switch button 48.

The means provided for heating the portion of the elongated element 18 which actually does the level sensing is generally designated 52. In the form here specifically disclosed by way of example it comprises an electrical circuit including a battery or other source of power 54, switch 56, adjustable resistor or potentiometer 58, and leads 60 and 62 extending to spaced points 64 and 66 on the elongated element 18. The lead 62 connects with the point 66 at the bottom of the element 18 by sealingly passing through the sealing element 20. The connection point 64 for the lead 60 is toward the upper end of the element 18 and may for convenience be located outside the container 2. That electric circuit, when the switch 56 is closed, causes current to pass through the element 18, thereby producing heat in that element. Where the liquid 10 is of insulating character, the element 18 as it passes through the liquid may be bare. If the liquid 10 is, or may be, of a substance having a significant electrical conductivity, then that portion of the element 18 adapted to pass through the liquid 10 will be sheathed in an insulating covering which will be thin enough and made of such material as not appreciably to affect the dissipation of heat from the element 18. Since the Nitinol memory material of which the element 18 may be formed is electrically conductive, this disclosed method of applying heat thereto is both simple and effective, but it will be understood that the heat applying system 52 may be specifically different from that here disclosed — for example, a separate heating element could be provided along the length of the strip 18, that heating element being electrically or otherwise energized in any appropriate manner and being flexible enough so as not to materially inhibit the tendency of the element 18 or sections to resume their "memory" configuration when subjected to the predetermined activating temperature.

Under normal circumstances, and as shown in FIG. 4, the amount of heat produced in the element 18 will be sufficiently great so that those portions of strip 18 which are exposed to air will attain a temperature above the predetermined activating temperature of the specific composition of which the element 18 is formed. However, those portions or sections of the element 18 which are enveloped or surrounded by the liquid 10, such as water, having a heat-dissipating characteristic greater than that of air, will be at a lower temperature than those portions of the element 18 exposed to air. The amount of heat provided to the element 18 will be such that those portions or sections of the element 18 immersed in the water 10 will not reach their predetermined "memory" activating temperature because the water surrounding them will remove heat from the element sections at a sufficient rate to prevent that temperature from being attained. The appropriate value of current passing through the element 18 can be achieved through adjustment of the resistor or potentiometer 58. Under these circumstances, and when the container 2 is full of liquid 10, no portion of the element 18 will be at a temperature above the activating temperature, the element 18 will remain in its substantially linear original configuration, the spring 34 will maintain the arm 26 in its upper position, and the switch 40 will be in its normal open-circuit condition.

As the level of the liquid 10 in the container 2 falls, more and more of the length of the elongated element 18 will be exposed to air or other ambient atmosphere. FIG. 4 illustrates an intermediate position for the water level 10, in which approximately one-fifth of the length of the element 18 is exposed to air. That portion of the length of the element 18 thus exposed to air will, because of the poorer heat-dissipating characteristics of air as compared with water, be heated to a temperature above the "memory" activating temperature, and those portions or sections of the element 18 will therefore tend to assume their "memory" configuration. They will exert a force in thus tending to resume their "memory" configuration, which force will be exerted in opposition to the tension of the spring 34 defining the biasing means 32. As disclosed in FIG. 4, the force exerted by the air-exposed portion of the element 18 is insufficient to overcome the force of the spring 34, and consequently the arm 26 remains in its upper position and the switch 40 remains in open-circuit condition. However, if the level of the liquid 10 in the container 2 should fall to a lower position than that shown in FIG. 4, more of the length of the element 18 will be exposed to air, will heat to a temperature above the activating temperature, and will tend to assume its "memory" configuration. Eventually the cumulative force of the various air-exposed segments of the element 18 in thus tending to resume their "memory" configuration will exceed the biasing force exerted by the spring 34. When that occurs the exposed portion of the strip 18 will in fact move toward its "memory" configuration, the arm 26 will be pulled down, the screw 50 will push the switch button 48 down, the circuit through the switch 42 will be closed, and the light 46 will light.

The arm 26 will remain in its down position, and the light or other alarm 46 will remain actuated, for so long as the level of liquid 10 in the container 2 is at or below the danger level which has caused the force exerted by the element 18 to exceed the force of the biasing means 32. As soon as the water level 10 rises above that level, as it will when the operator, or some automatically operated mechanism, sufficiently replenishes the water content in the container 2, the newly covered portions of the element 18 will cool to a temperature below their activating temperature, the cumulative force exerted by the element 18 in tending to resume its "memory" configuration will then be less than the force exerted by the biasing means 32, and hence the biasing means 32 will lift the arm 26, releasing the switch button 48, opening the circuit through the switch 42 and extinguishing the alarm light 46.

The system operation described above assumes that the temperature of the liquid 10 is below the activating temperature for the element 18. If, however, the temperature of the liquid 10 should rise to a value above that activating temperature, then the liquid-immersed section of the elongated element 18 will tend to assume its "memory" configuration, the biasing force of the biasing means 32 will be overcome, and the alarm 46 will be actuated.

Thus the system of the present invention, by means of simple and reliable structure, permits the accurate and rapid sensing of variations in liquid level, and at the same time senses excessive temperature of the liquid if that occurs. The operation of the system will depend in part upon the particular composition of the element 18, which determines its activating temperature, in part upon the amount of current passed through the active portion of the element 18, which determines in conjunction with the heat-dissipating characteristics of the liquid 10 and the ambient atmosphere, the temperatures to which its ambient-atmosphere-enveloped and liquid-enveloped sections will be heated, and in part on the adjustment of the biasing force exerted by the biasing means 32. These various parameters may be varied depending upon the particular applications where the system of the present invention is to be used — the nature, and particularly the heat-dissipating characteristics of the liquid 10 and of the ambient atmosphere which takes the place of that liquid 10, the desired maximum temperature for the liquid 10, and the like will all be appropriate controlling factors. Variation in the biasing force exerted by the biasing means 32 will primarily control the particular liquid level at which the alarm 46 or other work element is to be actuated.

While but a single embodiment of the present invention has been here specifically disclosed, it will be apparent that many variations may be made therein, the essence of the invention being described and defined in the appended claims.

I claim:

1. In combination with a container having bottom and side walls defining a chamber in which a given liquid is adapted to be received, means for detecting a level of liquid in said chamber comprising an elongated element formed of material having the characteristic that sections along its length, when subjected to a temperature below a predetermined temperature, will tend to retain their given configuration but when subjected to said predetermined temperature will tend to change their configuration from said given configuration to a different configuration, mounting means operatively connected between said element and said container and active to mount said element within said container in an orientation extending in its said given configuration generally upwardly relative to said bottom wall along a portion of the depth of said chamber where liquid level is to be sensed, the length of said element extending over at least a substantial portion of the depth of said container and over that portion of said depth where the level of said liquid may vary, a part of the length of said element being immersed in said liquid for substantially all expected levels thereof, means for providing heat to said element in an amount insufficient to raise the temperature of a section of said element above said predetermined temperature if said section is subjected to heat-dissipating conditions characteristic of being enveloped in said given liquid but in an amount sufficient to raise the temperature of said section above said predetermined temperature if said section is subjected to heat-dissipating conditions characteristic of being enveloped in a substance having a heat-dissipating characteristic significantly different from that of said given liquid, work means effective when actuated to perform a work operation appropriate to the detection of a predetermined liquid level in said chamber, said work means comprising a part movable between first and second positions corresponding respectively to actuated and de-actuated conditions of said work means, and a mechanical connection between said part and said element, and means biasing said part to one of said positions, said element moving said part to the other of said positions when the force exerted by sections of said element tending to change their configuration from their given configuration to their different configuration exceeds the force exerted on said part by said biasing means.

2. The combination of claim 1, in which said element is electrically conductive, electrical connections being provided to spaced points along said element, said heat-providing means comprising means for passing an electrical current through said element via said connections.

3. The combination of claim 1, in which said biasing means is also active on said element and tends to keep said element in its given configuration.

* * * * *